United States Patent
Stinebring et al.

(10) Patent No.: US 11,673,600 B2
(45) Date of Patent: Jun. 13, 2023

(54) STEERING COLUMN ASSEMBLY AND METHOD OF MANUFACTURE

(71) Applicant: STEERING SOLUTIONS IP HOLDING CORPORATION, Saginaw, MI (US)

(72) Inventors: Scott A. Stinebring, Auburn, MI (US); Jacob A. Caverly, Freeland, MI (US); Robert D. Maida, Pinconning, MI (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 45 days.

(21) Appl. No.: 16/204,554

(22) Filed: Nov. 29, 2018

(65) Prior Publication Data
US 2020/0172146 A1   Jun. 4, 2020

(51) Int. Cl.
*B62D 1/187* (2006.01)
*F16B 7/04* (2006.01)
*B62D 1/189* (2006.01)
*B62D 1/181* (2006.01)

(52) U.S. Cl.
CPC ............. *B62D 1/187* (2013.01); *B62D 1/189* (2013.01); *F16B 7/0406* (2013.01); *B62D 1/181* (2013.01)

(58) Field of Classification Search
CPC .......... B62D 1/187; B62D 1/18; B62D 1/189; B62D 1/16; B62D 1/181; F16B 7/0406; F16B 33/002
USPC ........................................................ 74/493
See application file for complete search history.

(56) References Cited

U.S. PATENT DOCUMENTS

| | | | |
|---|---|---|---|
| 8,844,400 B2* | 9/2014 | Morinaga | B62D 1/181 74/495 |
| 9,022,427 B2* | 5/2015 | Schnitzer | F16M 13/02 280/775 |
| 2004/0023746 A1* | 2/2004 | Arihara | B62D 1/181 475/280 |
| 2005/0011297 A1* | 1/2005 | Oshita | B62D 1/187 74/493 |
| 2006/0185462 A1* | 8/2006 | Berg | B62D 1/187 74/493 |
| 2007/0127982 A1* | 6/2007 | Bohlen | F16B 21/02 403/119 |

(Continued)

FOREIGN PATENT DOCUMENTS

| | | | | |
|---|---|---|---|---|
| CN | 106275052 A | | 1/2017 | |
| DE | 102018130132 A1 * | | 5/2019 | B62D 1/187 |

(Continued)

OTHER PUBLICATIONS

Machine Translation of DE-102018130132-A1 (Year: 2018).*

(Continued)

*Primary Examiner* — Paul N Dickson
*Assistant Examiner* — Kurtis Nielson
(74) *Attorney, Agent, or Firm* — Dickinson Wright PLLC

(57) ABSTRACT

A method of assembling a steering column assembly includes pressing a first pivot bushing into a first rake bracket first opening of a first rake bracket and inserting a first pivot fastener into the first pivot bushing and into a first mounting bracket opening of a first mounting bracket arm of a mounting bracket. The method further includes displacing material of the first mounting bracket arm with first splines of the first pivot fastener to form first mating splines within the first mounting bracket opening.

5 Claims, 6 Drawing Sheets

(56) References Cited

U.S. PATENT DOCUMENTS

| | | | | |
|---|---|---|---|---|
| 2007/0137381 A1* | 6/2007 | Arihara | ............ | B62D 1/181 |
| | | | | 74/493 |
| 2011/0162904 A1* | 7/2011 | Yoon | ............ | B62D 1/192 |
| | | | | 180/444 |
| 2011/0215560 A1* | 9/2011 | Born | ............ | B62D 1/181 |
| | | | | 280/775 |
| 2015/0251683 A1* | 9/2015 | Caverly | ............ | B62D 1/181 |
| | | | | 74/493 |
| 2017/0015345 A1* | 1/2017 | Galehr | ............ | B62D 1/187 |
| 2017/0097071 A1* | 4/2017 | Galehr | ............ | B62D 1/181 |
| 2017/0120944 A1* | 5/2017 | Kato | ............ | B62D 1/181 |
| 2018/0086363 A1* | 3/2018 | Stinebring | ............ | B62D 1/187 |
| 2018/0118025 A1* | 5/2018 | Vermeersch | ............ | B60K 20/06 |
| 2018/0141581 A1* | 5/2018 | Kato | ............ | F16H 25/20 |
| 2018/0237052 A1* | 8/2018 | Kurokawa | ............ | B62D 1/185 |
| 2019/0061803 A1* | 2/2019 | Inoue | ............ | B62D 1/189 |
| 2020/0039567 A1* | 2/2020 | Sekiguchi | ............ | B62D 1/185 |
| 2020/0101999 A1* | 4/2020 | Kirmsze | ............ | B62D 1/184 |

FOREIGN PATENT DOCUMENTS

| | | | | | |
|---|---|---|---|---|---|
| DE | 102019200250 A1 * | 7/2020 | ............ | B62D 1/189 |
| EP | 2055611 A1 * | 5/2009 | ............ | B62D 1/181 |
| JP | 2016160993 A * | 9/2016 | | |
| WO | WO-2019162253 A1 * | 8/2019 | ............ | B62D 1/189 |
| WO | WO-2020035364 A1 * | 2/2020 | ............ | B62D 1/181 |

OTHER PUBLICATIONS

English translation of First Office Action and Search Report regarding corresponding CN App. No. 2019111989443; dated Nov. 3, 2021.

* cited by examiner

STEERING COLUMN ASSEMBLY AND METHOD OF MANUFACTURE

BACKGROUND

The present disclosure relates to an adjustable steering column assembly.

Steering column assemblies are provided with features that enable the steering column assembly to be raised or lowered as well as translated in and out relative to an operator of the vehicle. These features take up a lot of packaging space to accommodate the adjustment of the steering column assembly. Furthermore these features may employ multiple components that require staking, welding, or other processes to couple the components together.

SUMMARY OF THE INVENTION

Disclosed is a steering column assembly that includes a lower jacket, a mounting bracket, and a rake bracket assembly. The lower jacket is arranged to slidably receive an upper jacket along a steering column axis. The mounting bracket has a first mounting bracket arm defining a first mounting bracket opening and a second mounting bracket arm defining a second mounting bracket opening that is disposed coaxial with the first mounting bracket opening along a first axis. The rake bracket assembly is arranged to facilitate movement of the lower jacket about a pivot axis that is disposed transverse to the steering column axis. The rake bracket assembly includes a first rake bracket and a second rake bracket. The first rake bracket is arranged to be coupled to the first mounting bracket arm. The first rake bracket defines a first rake bracket first opening that is disposed coaxial with the first mounting bracket opening and a first rake bracket second opening along a first axis. The second rake bracket is arranged to be coupled to the second mounting bracket arm. The second rake bracket defines a second rake bracket first opening that is disposed coaxial with the second mounting bracket opening and a second rake bracket second opening that is disposed coaxial with the first rake bracket second opening along a second axis.

Also disclosed is as a method of assembling a steering column assembly. The method includes pressing a first pivot bushing into a first rake bracket first opening of a first rake bracket and inserting a first pivot fastener into the first pivot bushing and into a first mounting bracket opening of a first mounting bracket arm of a mounting bracket. The method further includes displacing material of the first mounting bracket arm with first splines of the first pivot fastener to form first mating splines within the first mounting bracket opening.

These and other advantages and features will become more apparent from the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Referring now to the Figures, where the invention will be described with reference to specific embodiments, without limiting same, it is to be understood that the disclosed embodiments are merely examples of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the invention.

Figure 1:
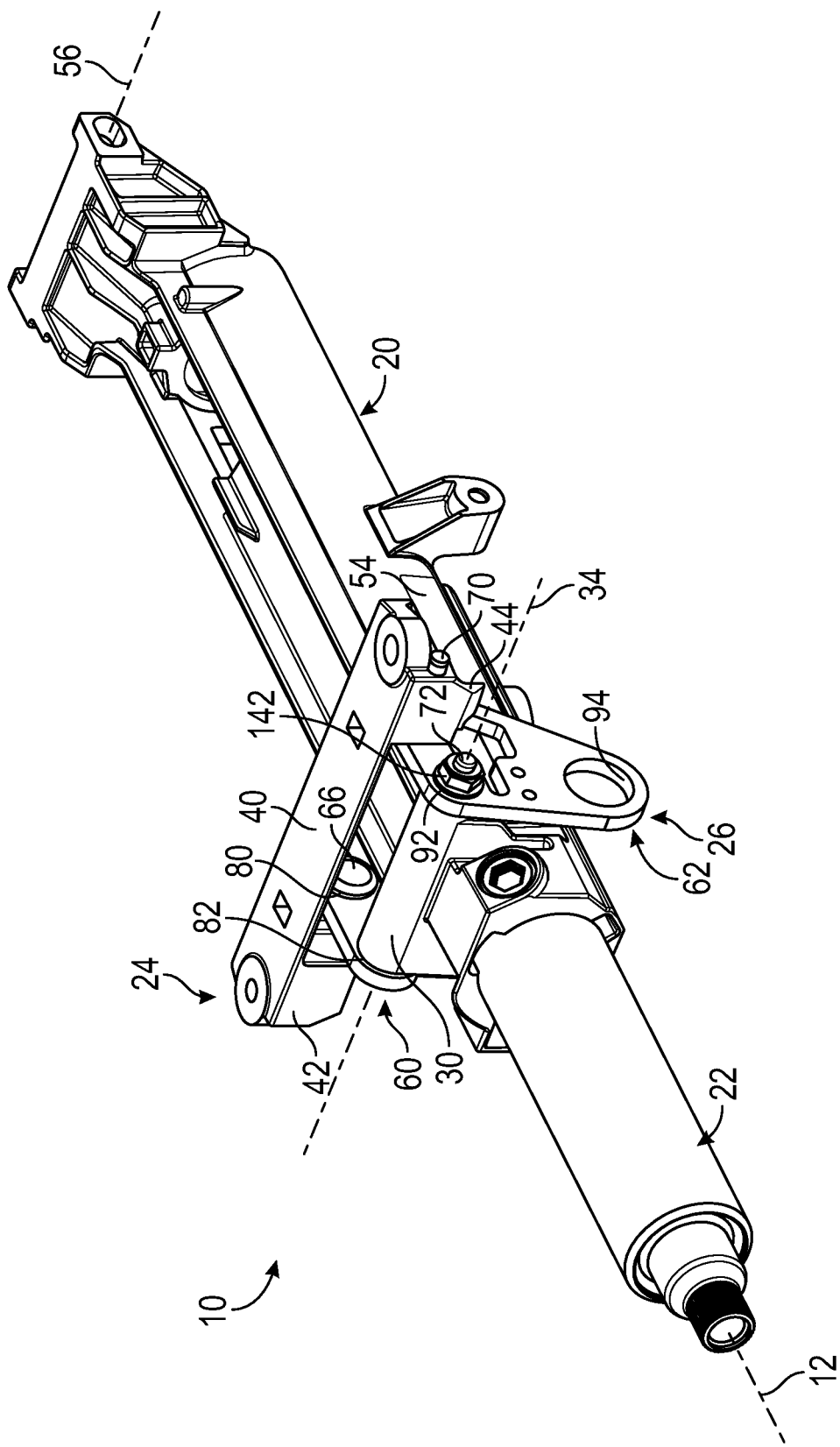
FIG. 1 is a perspective view of a steering column assembly having a rake bracket assembly.

Referring to FIG. 1, a steering column assembly 10 is shown the steering column assembly 10 may be a rake adjustable and telescope adjustable steering column. The steering column assembly 10 includes a lower jacket 20, an upper jacket 22, a mounting bracket 24, and a rake bracket assembly 26.

The lower jacket 20 is disposed about the steering column axis 12. The lower jacket 20 defines an inner bore that slidably or telescopically receives at least a portion of the upper jacket 22. The lower jacket 20 is operatively connected to a vehicle structure through the mounting bracket 24, an intervening component, or directly to the vehicle structure. The lower jacket 20 is provided with or defines a mounting tube 30 that is disposed proximate a proximal end of the lower jacket 20. The mounting tube 30 may be a formed tube that defines a mounting opening 32 that extends along an axis 34 that is disposed transverse to the steering column axis 12, as shown in FIGS. 5 and 8-11.

The upper jacket 22 extends longitudinally along the steering column axis 12 and is at least partially received within the lower jacket 20. The upper jacket 22 is movable relative to the lower jacket 20 along the steering column axis 12 by operation of a telescope actuator. The combination of the lower jacket 20 and the upper jacket 22 is raised or lowered through the operation of a rake adjustment mechanism that is coupled to at least one of the mounting bracket 24 and the rake bracket assembly 26.

Figure 2:
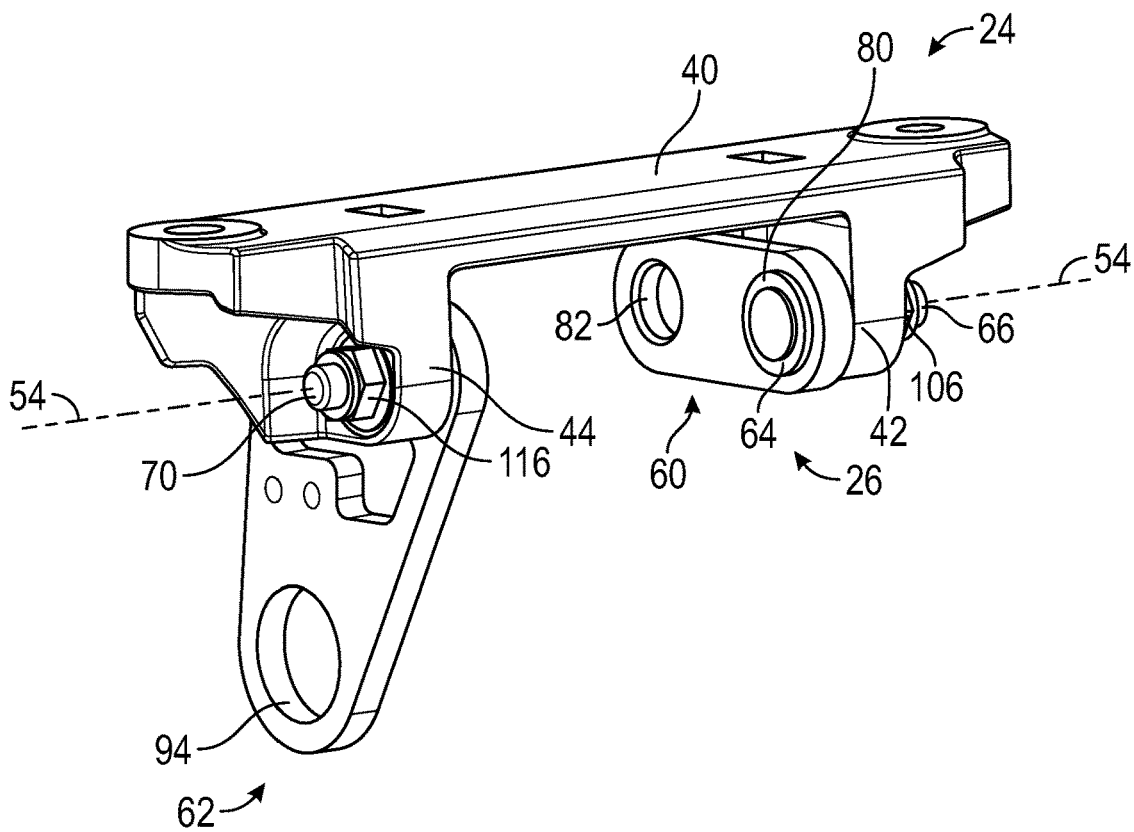
FIG. 2 is a perspective view of the rake bracket assembly.
Figure 3:
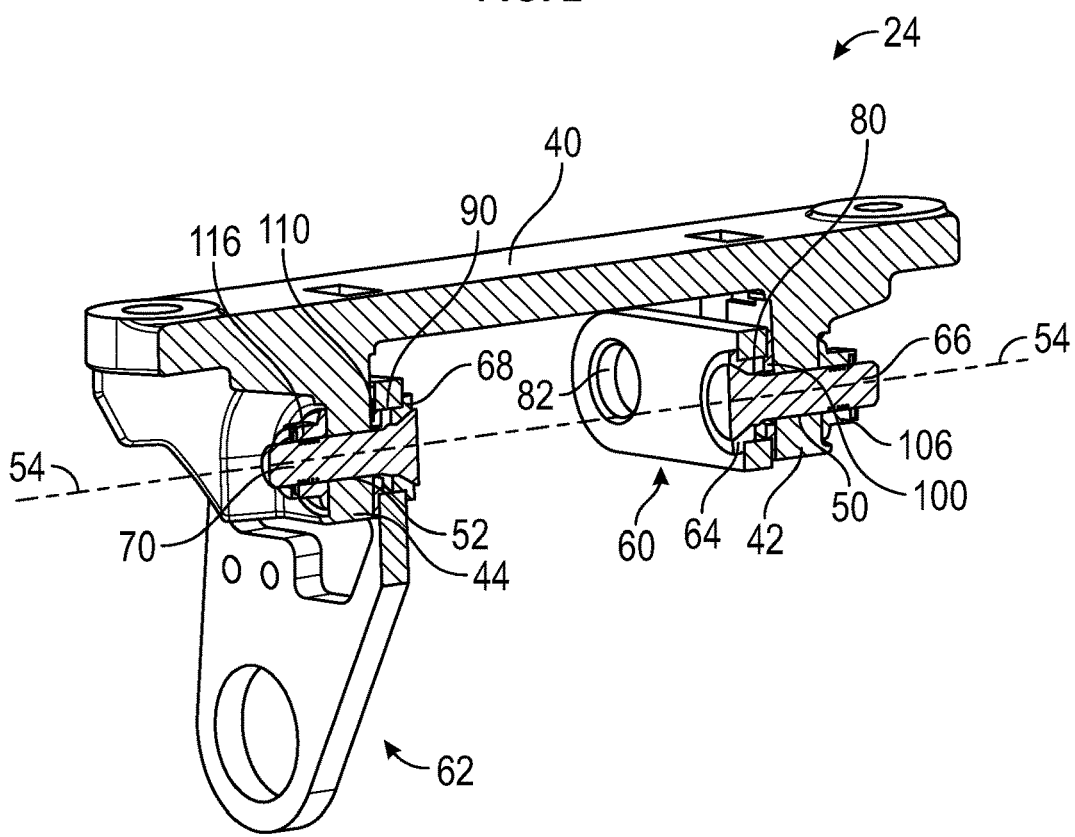
FIG. 3 is a partial section view of the rake bracket assembly.

Referring to FIGS. 1-3, the mounting bracket 24 extends across the lower jacket 20 and is connected to the lower jacket 20 through the rake bracket assembly 26. The mounting bracket 24 includes a mounting bracket body 40, a first mounting bracket arm 42, and a second mounting bracket arm 44. The first mounting bracket arm 42 is disposed proximate a first end of the mounting bracket body 40 such that the first mounting bracket arm 42 is arranged to be disposed proximate a first side of the lower jacket 20. The first mounting bracket arm 42 defines a first mounting bracket opening 50. The second mounting bracket arm 44 is spaced apart from the first mounting bracket arm 42 and is disposed proximate a second end of the mounting bracket body 40 such that the second mounting bracket arm 44 is arranged to be disposed proximate a second side of the lower jacket 20. The second mounting bracket arm 44 defines a second mounting bracket opening 52. The first mounting bracket opening 50 is disposed coaxial with the second mounting bracket opening 52 along an axis 54 that is disposed parallel to the axis 34.

Referring to FIGS. 1-4, the rake bracket assembly 26 is connected to the mounting bracket 24 and the lower jacket 20. The rake bracket assembly 26 is arranged to facilitate movement of the lower jacket about a pivot axis 56 that is disposed transverse to the steering column axis 12 and is disposed parallel to a first axis (the axis 54) and a second axis (the axis 34). The rake bracket assembly 26 includes a first rake bracket 60 that is arranged to be coupled to the first mounting bracket arm 42, a second rake bracket 62 that is arranged to be coupled to the second mounting bracket arm 44, a first pivot bushing 64, a first pivot fastener 66, a second pivot bushing 68, a second pivot fastener 70, and a pin 72.

The first rake bracket 60 defines a first rake bracket first opening 80 and a first rake bracket second opening 82. The first rake bracket first opening 80 is disposed coaxial with the first mounting bracket opening 50 along the first axis 54. The first rake bracket second opening 82 is spaced apart from the first rake bracket first opening 80.

The second rake bracket 62 defines a second rake bracket first opening 90, a second rake bracket second opening 92, and a rake actuator opening 94. The second rake bracket first opening 90 is disposed coaxial with the second mounting bracket opening 52 along the first axis 54. The second rake bracket second opening 92 is disposed coaxial with the first rake bracket second opening 82 along the second axis 34. The rake actuator opening 94 is spaced apart from the second rake bracket first opening 90 and the second rake bracket second opening 92. The rake actuator opening 94 is arranged to couple the second rake bracket 62 to a rake actuator or rake adjustment mechanism to facilitate the rake adjustment of the steering column assembly 10.

The first pivot bushing 64 is at least partially disposed within the first rake bracket first opening 80. The first pivot bushing 64 may be pressed into the first rake bracket first opening 80. A first washer 100 may be disposed between the first mounting bracket arm 42 and the first rake bracket 60. The first washer 100 may at least partially extend into the first rake bracket first opening 80. The first washer 100 may be a thrust washer. The first pivot fastener 66 extends at least partially through the first pivot bushing 64, the first washer 100, the first mounting bracket opening 50 to couple the first rake bracket 60 to the first mounting bracket arm 42.

Figure 4:
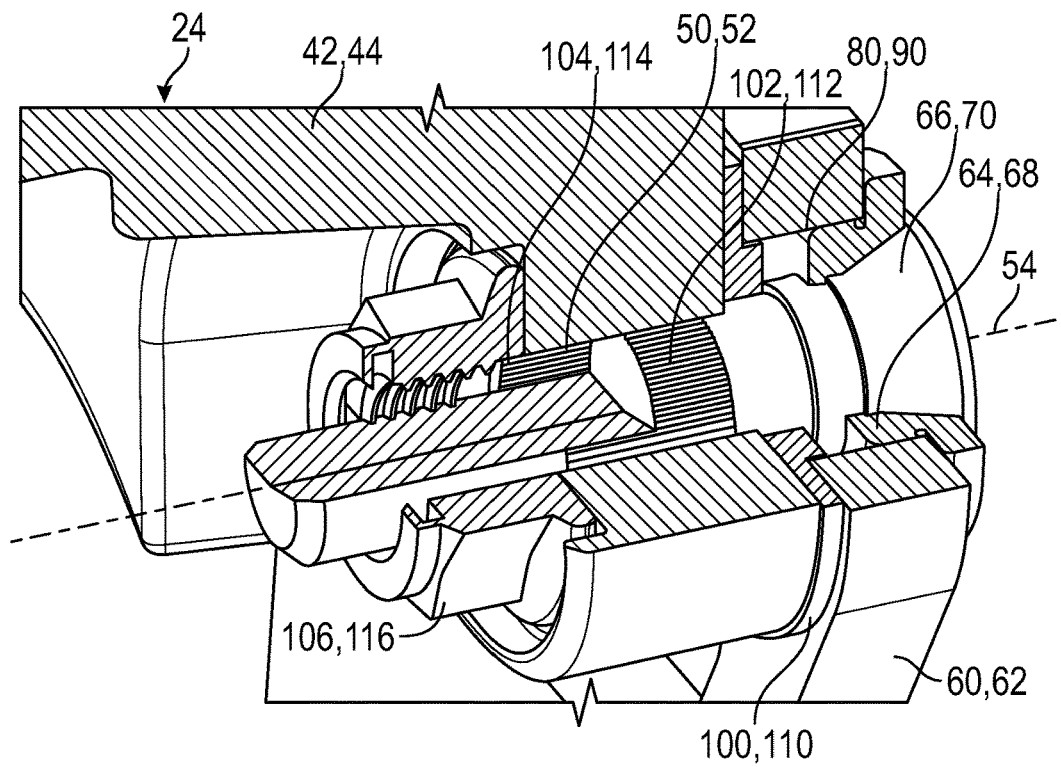
FIG. 4 is a partial section view of a portion of FIG. 3.
Figure 5:
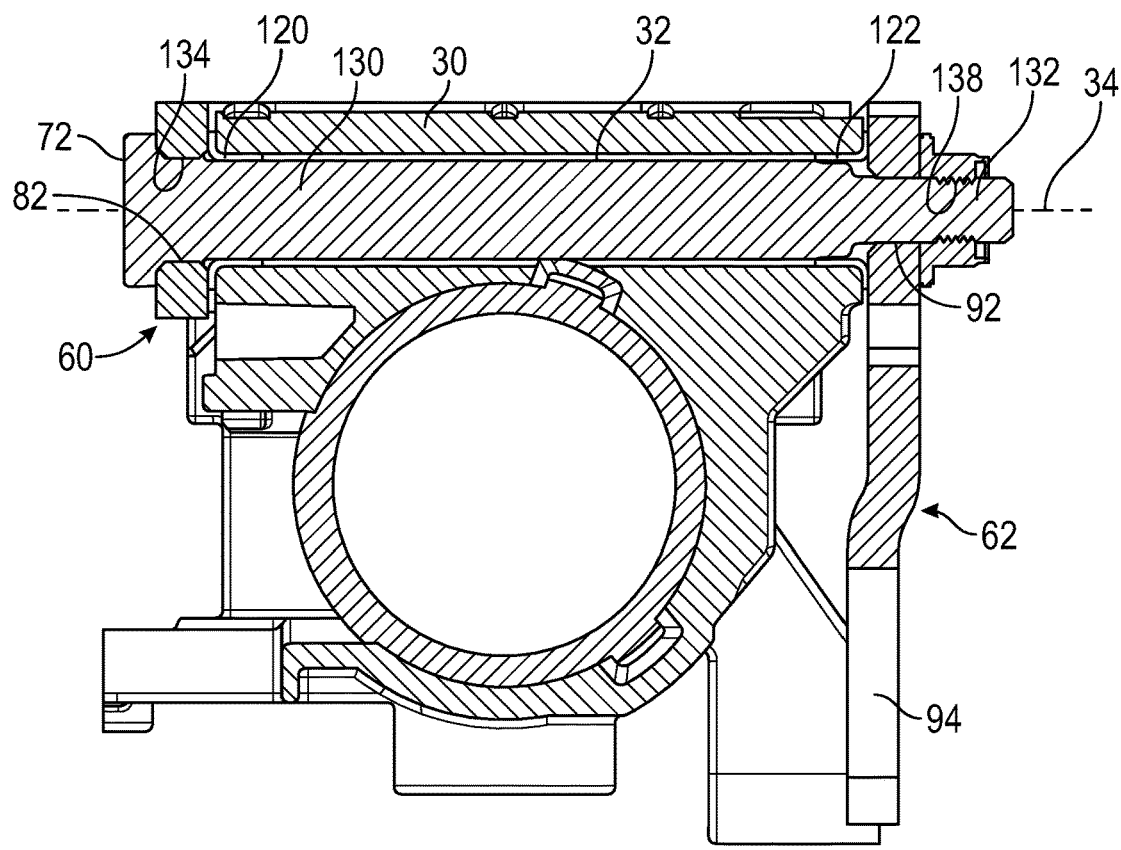
FIG. 5 is a partial front view of the steering column assembly.

Referring to FIG. 4, the first pivot fastener 66 is provided with first splines 102. The first splines 102 may be parallel splines that extends along a portion of a shank of the first pivot fastener 66 and are disposed parallel to the first axis 54. The first splines 102 are arranged to displace material of the first mounting bracket arm 42 that defines the first mounting bracket opening 50 to form first mating splines 104 within the first mounting bracket opening 50 due to the pressing or drawing of the first pivot fastener 66 into the first mounting bracket opening 50. A nut 106 may be secured to an end of the first pivot fastener 66 to de-lash the interface through which the first pivot fastener 66 extends.

The second pivot bushing 68 is at least partially disposed within the second rake bracket first opening 90. The second pivot bushing 68 may be pressed into the second rake bracket first opening 90. A second washer 110 may be disposed between the second mounting bracket arm 44 and the second rake bracket 62. The second washer 110 may at least partially extend into the second rake bracket first opening 90. The second washer 110 may be a thrust washer. The second pivot fastener 70 extends at least partially through the second pivot bushing 68, the second washer 110, the second mounting bracket opening 52 to couple the second rake bracket 62 to the second mounting bracket arm 44.

Referring to FIG. 4, the second pivot fastener 70 is provided with second splines 112. The second splines 112 may be parallel splines that extends along a portion of a shank of the second pivot fastener 70 and are disposed parallel to the first axis 54. The second splines 112 are arranged to displace material of the second mounting bracket arm 44 that defines the second mounting bracket opening 52 to form second mating splines 114 within the second mounting bracket opening 52 due to the pressing or drawing of the second pivot fastener 70 into the second mounting bracket opening 52. A nut 116 may be secured to an end of the second pivot fastener 70 to de-lash the interface through which the second pivot fastener 70 extends.

The securing of the first pivot fastener 66 with the first mounting bracket arm 42 and the securing of the second pivot fastener 70 with the second mounting bracket arm 44 facilitates the alignment of the first rake bracket second opening 82 with the second rake bracket second opening 92 along the first axis 54. The lining of the first rake bracket second opening 82 and the second rake bracket second opening 92 enables the pin 72 to couple the rake bracket assembly 26 to the lower jacket 20.

Referring to FIGS. 1 and 5-11, the pin 72 is arranged to extend through the first rake bracket second opening 82, the mounting opening 32 of the mounting tube 30, the second rake bracket second opening 92 along the second axis 34 to couple the first rake bracket 60 and the second rake bracket 62 to the lower jacket 20. A first bushing 120 may be pressed into a first end of the mounting opening 32 of the mounting tube 30 and a second bushing 122 may be pressed into a second end of the mounting opening 32 of the mounting tube 30.

Figure 6:
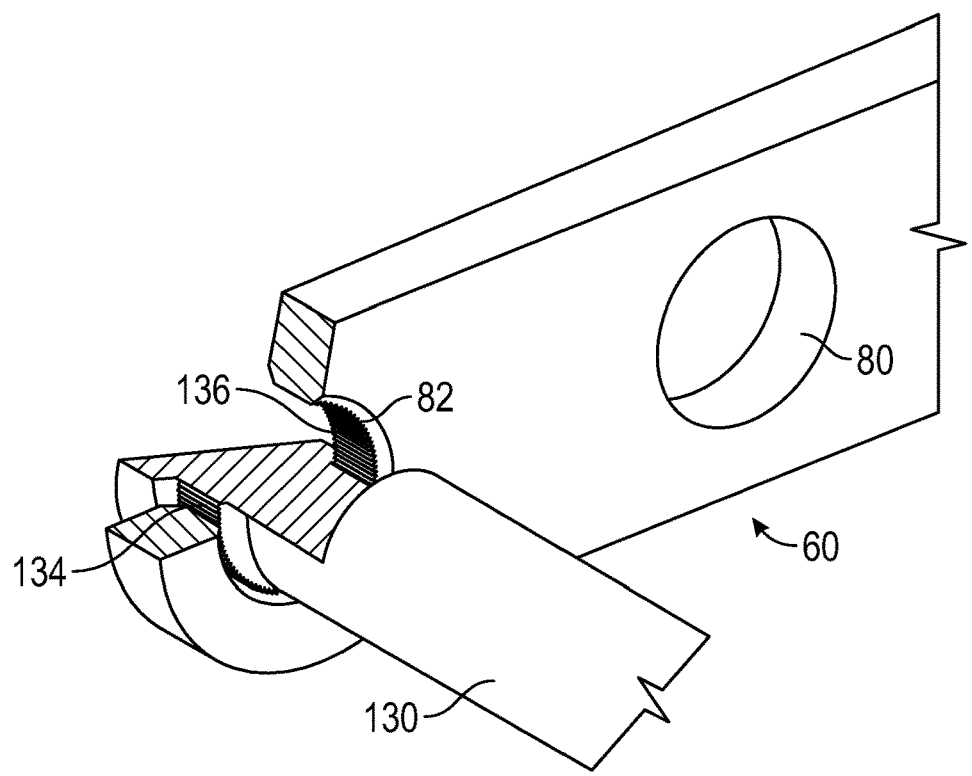
FIG. 6 is a partial section view of a first portion of FIG. 5.
Figure 7:
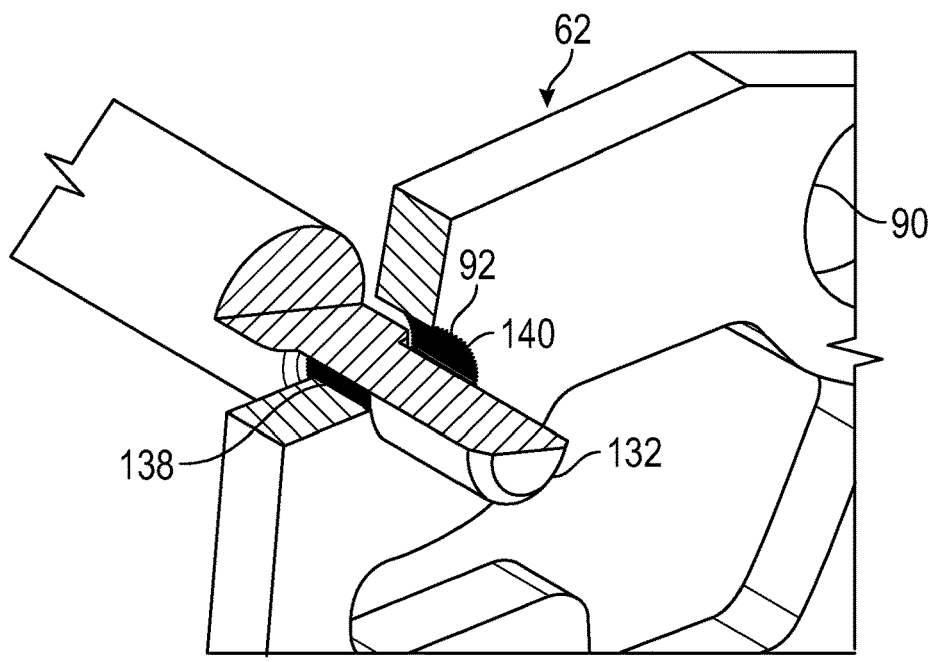
FIG. 7 is a partial section view of a second portion of FIG. 5.
Figure 8:
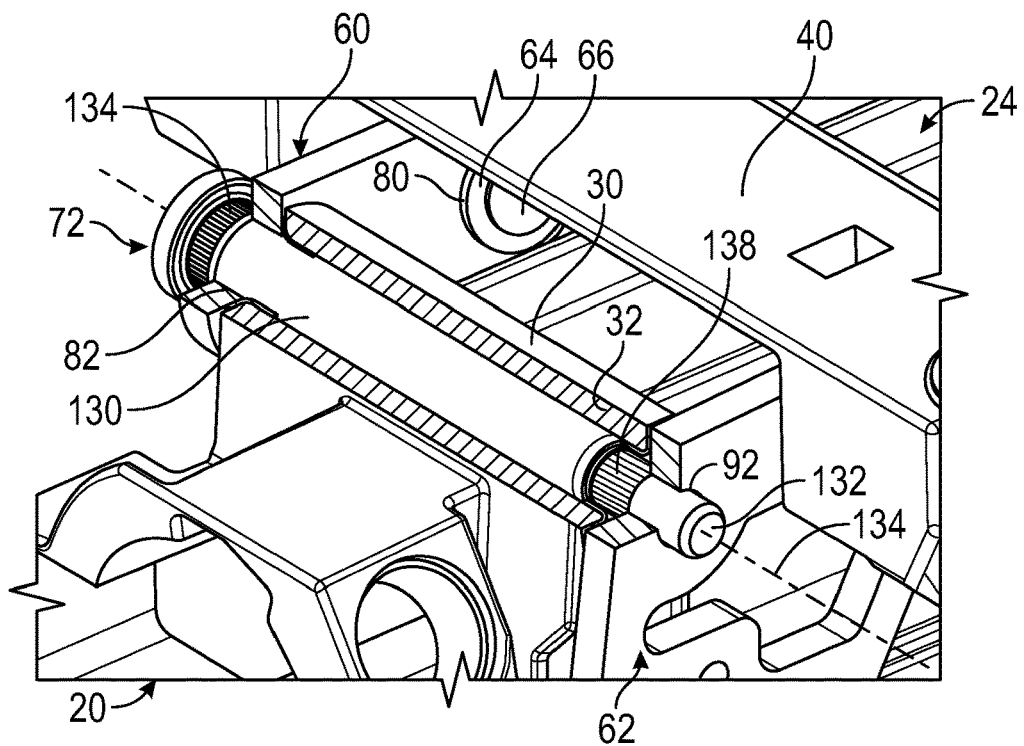
FIGS. 8 and 9 are views of an illustrative assembly step of the present disclosure.
Figure 9:
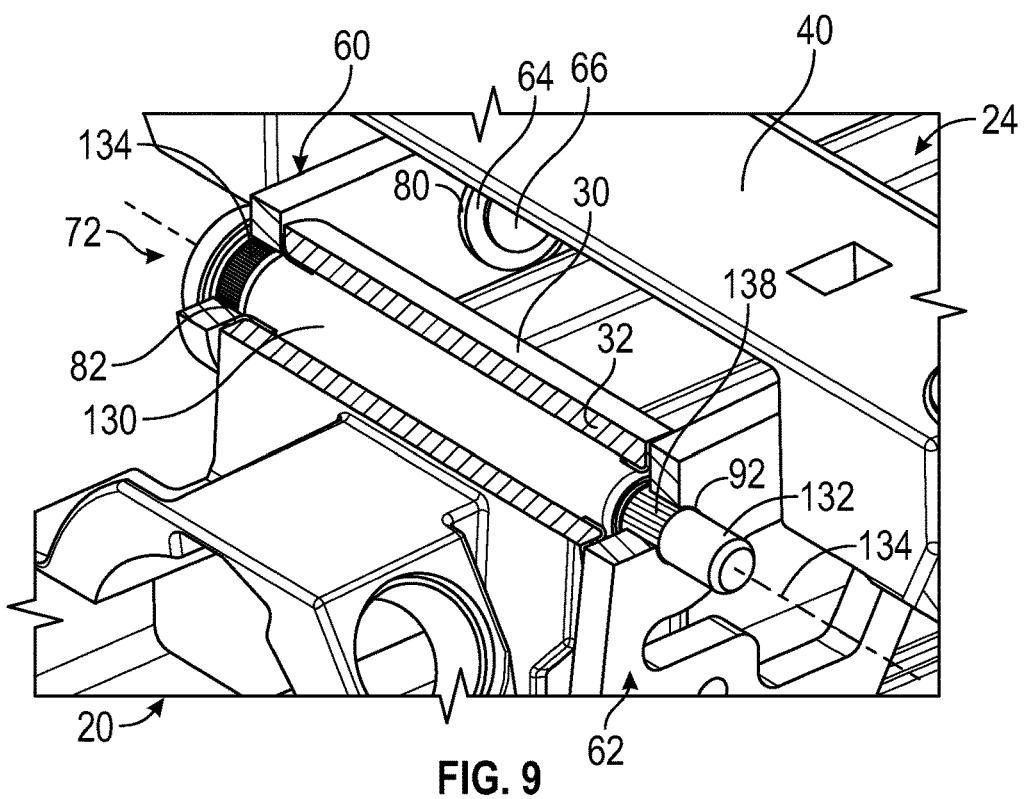
Figure 10:
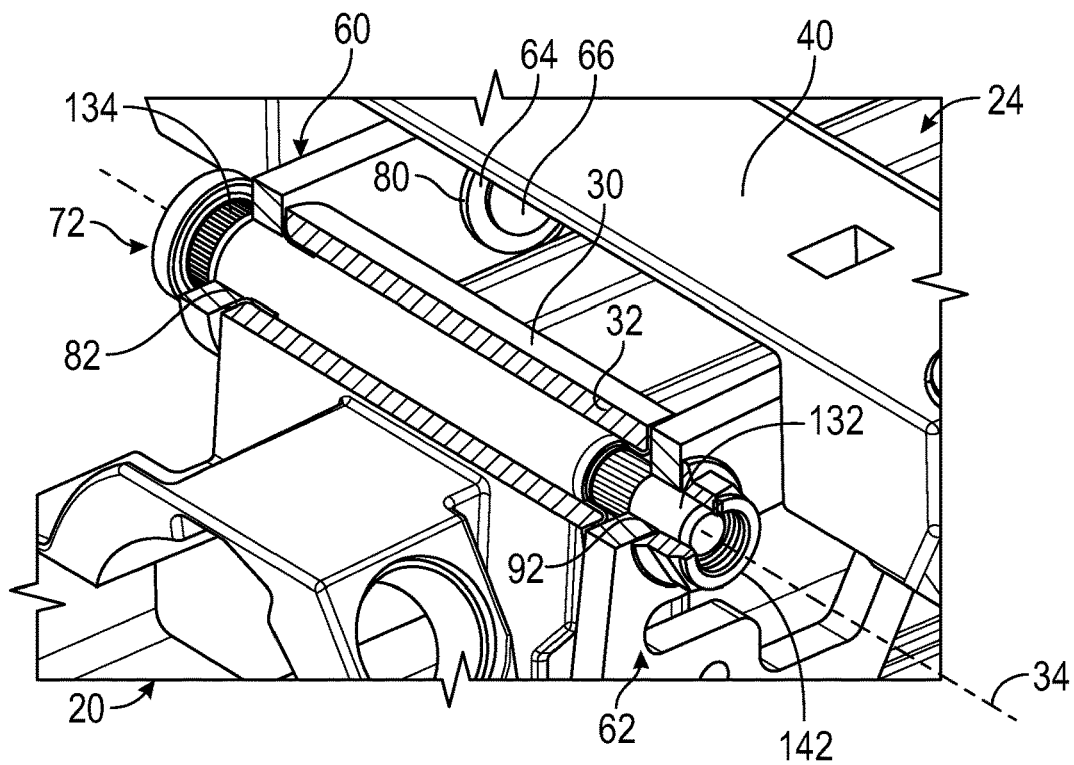
FIGS. 10 and 11 are views of an illustrative assembly step of the present disclosure.
Figure 11:
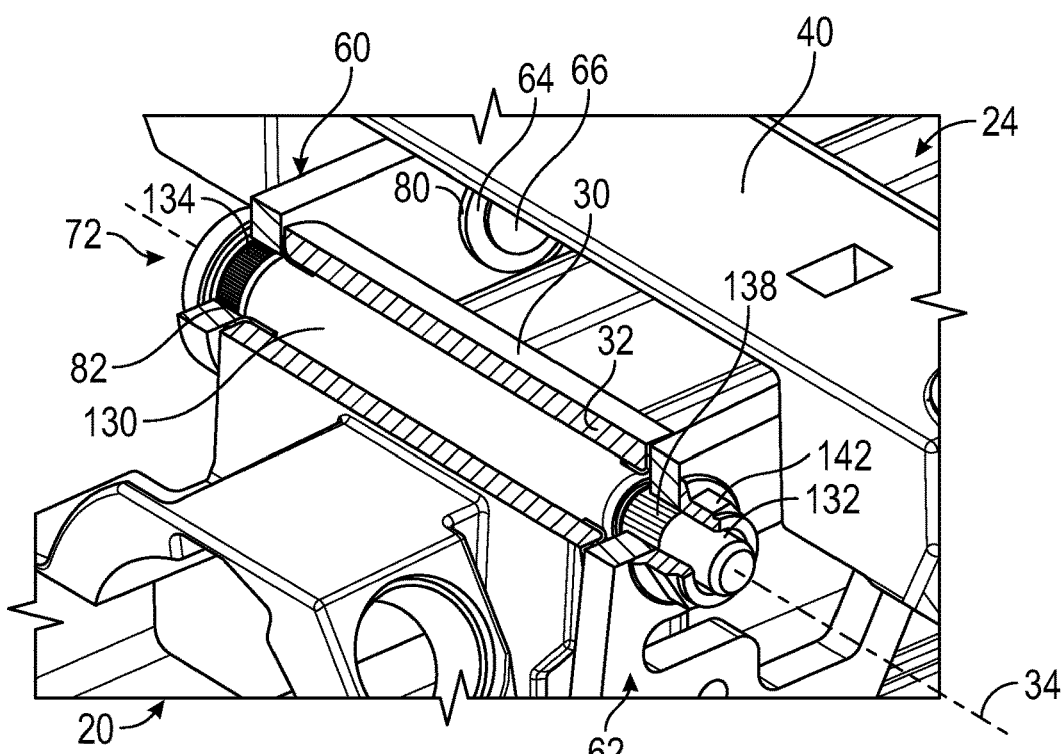

The pin 72 includes a first pin portion 130 and a second pin portion 132 that extends from the first pin portion 130. The first pin portion 130 is provided with first serrations 134 that are arranged to displace material of the first rake bracket 60 to form first mating serrations 136 within the first rake bracket second opening 82, as shown in FIG. 6. The second pin portion 132 is provided with second serrations 138 that are arranged displace material of the second rake bracket 62 to form second mating serrations 140 within the second rake bracket second opening 92, as shown in FIG. 7. The first serrations 134 of the first pin portion 130 and the second serrations 138 of the second pin portion 132 are arranged displace material within the respective bracket openings 82, 92 due to the pressing, as shown in FIGS. 8 and 9, or drawing, as shown in FIGS. 10 and 11, of the pin 72 into the first rake bracket second opening 82 and the second rake bracket second opening 92. The pin 72 may be drawn by applying torque to or tightening a nut 142 about the second pin portion 132.

The pressing or the drawing of the pin 72 into or through the first rake bracket 60 and the second rake bracket 62 aligns the first rake bracket 60 and the second rake bracket 62 and keys the first rake bracket 60 and the second rake bracket 62 rotationally for a stiff structurally robust pivot joint. The nuts 142 retains the system clamp load and may be adjusted to provide a predetermined pivot load. Furthermore, the pressing or drawing of the pin 72 eliminates rotational lash or lateral lash.

A method of manufacturing a steering column assembly 10 may be performed as follows. The first pivot bushing 64 is pressed into the first rake bracket first opening 80 of the first rake bracket 60. The first pivot fastener 66 is inserted into the first pivot bushing 64 and into the first mounting bracket opening 50 of the first mounting bracket arm 42 of the mounting bracket 24. The first pivot fastener 66 may be pressed into the first mounting bracket opening 50 such that material of the first mounting bracket arm 42 is displaced by the first splines 102 of the first pivot fastener 66 to form first mating splines 104 within the first mounting bracket opening 50.

The pressing or the drawing of the first pivot fastener 66 through the first rake bracket 60 broaches the form of the first splines 102 into the first rake bracket 60. This broaching action keys the interface between the first pivot fastener 66 and the first rake bracket 60 to maintain a position of the first rake bracket 60 relative to the second rake bracket 62.

The second pivot bushing 68 is pressed into the second rake bracket first opening 90 of the second rake bracket 62. The second pivot fastener 70 is inserted into the second pivot bushing 68 and into the second mounting bracket opening 52 of the mounting bracket 24. The second pivot fastener 70 may be pressed into the second mounting bracket opening 52 such that material of the second mounting bracket arm 44 is displaced by second splines 112 of the second pivot fastener 70 to form second mating splines 114 within the second mounting bracket opening 52.

The pressing or the drawing of the second pivot fastener 70 through the second rake bracket 62 broaches the form of the second splines 112 into the second rake bracket 62. This broaching action keys the interface between the second pivot fastener 70 and the second rake bracket 62 to maintain a position of the second rake bracket 62 relative to the first rake bracket 60.

Engagement between the first splines 102 of the first pivot fastener 66 and the first mating splines 104 of the first mounting bracket opening 50 and engagement between the second splines 112 of the second pivot fastener 70 and the second mating splines 114 of the second mounting bracket opening 52 maintains a position of the first rake bracket 60 relative to the second rake bracket 62 such that the first rake bracket first opening 80, the first mounting bracket opening 50, the second rake bracket first opening 90, and the second mounting bracket opening 52 are all disposed coaxial with each other along the first axis 54. Furthermore, the first rake bracket second opening 82 is disposed coaxial with the second rake bracket second opening 92 along the second axis 34.

The pin 72 is inserted through the first rake bracket second opening 82 of the first rake bracket 60, the mounting opening 32 of the mounting tube 30 of the lower jacket 20, and the second rake bracket second opening 92 of the second rake bracket 62 along the second axis 34. The pin 72 may be pressed or drawn into the first rake bracket second opening 82 and the second rake bracket second opening 92. The first pin portion 130 of the pin 72 may be pressed into or drawn through the first rake bracket second opening 82 such that material of the first rake bracket 60 is displaced by first serrations 134 of the first pin portion 130 to form first mating serrations 136 within the first rake bracket second opening 82. The second pin portion 132 of the pin 72 may be pressed into or drawn through the second rake bracket second opening 92 such that material of the second rake bracket 62 is displaced by second serrations 138 of the second pin portion 132 to form second mating serrations 140 within the second rake bracket second opening 92.

The pressing or the drawing of the pin 72 through the rake brackets 60, 62 and through the lower jacket 20 broaches the form of the first serrations 134 into the first rake bracket 60 and broaches the form of the second serrations 138 into the second rake bracket 62. This broaching action keys the interface between the pin 72 and the rake brackets 60, 62 to transmit torque and assist in raising and lowering the steering column assembly 10. The nut 142 is fastened about the second pin portion 132 to add tensile load to the entire joint, which increases thrust load on the first and second bushings 120, 122, effectively increasing the rotational effort of the joint through which the pin 72 extends.

The broaching of the interface between the fasteners and the rake brackets eliminates welding and pre-serrated brackets, reducing the number of assembly steps and decreasing the overall system cost.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

Having thus described the invention, it is claimed:

1. A steering column assembly, comprising:
a lower jacket arranged to slidably receive an upper jacket along a steering column axis, the lower jacket defining a mounting opening that extends transverse to the steering column axis;
a mounting bracket having a first mounting bracket arm defining a first mounting bracket opening and a second mounting bracket arm defining a second mounting bracket opening that is disposed coaxial with the first mounting bracket opening along a first axis; and
a rake bracket assembly arranged to facilitate movement of the lower jacket about a pivot axis that is disposed transverse to the steering column axis, the rake bracket assembly, comprising:
a first rake bracket arranged to be coupled to the first mounting bracket arm, the first rake bracket defining a first rake bracket first opening that is disposed coaxial with the first mounting bracket opening, the first rake bracket also defining a first rake bracket second opening oriented along a second axis;
a second rake bracket disposed along a radially outer surface of the lower jacket, the second rake bracket having a first planar side and a second planar side, the first planar side and the second planar side extending along an entirety of the second rake bracket, the second rake bracket arranged to be coupled to the second mounting bracket arm, the second rake bracket defining a second rake bracket first opening that is disposed coaxial with the second mounting bracket opening and a second rake bracket second opening that is disposed coaxial with the first rake bracket second opening along the second axis, the second rake bracket also defining a rake actuator opening spaced apart from the second rake bracket first opening and the second rake bracket second opening, the rake actuator opening arranged to couple the second rake bracket to a rake actuator or rake adjustment mechanism to facilitate rake adjustment of the steering column assembly, wherein the first rake bracket second opening and the second rake bracket second opening each have a cylindrical geometry;

a pin that extends through the first rake bracket second opening, the mounting opening, and the second rake bracket second opening to couple the first rake bracket and the second rake bracket to the lower jacket, the pin having a first pin portion provided with first serrations that are arranged to displace material of the first rake bracket to form first mating serrations within the first rake bracket second opening, the pin having a second pin portion that extends from the first pin portion, the second pin portion provided with second serrations that are arranged to displace material of the second rake bracket to form second mating serrations within the second rake bracket second opening, wherein neither of the first rake bracket and the second rake bracket extend over the steering column axis or the lower jacket;

a first pivot bushing that is at least partially disposed within the first rake bracket first opening;

a first pivot fastener that extends at least partially through the first pivot bushing and the first mounting bracket opening to couple the first rake bracket to the first mounting bracket arm, wherein the first pivot fastener having first splines that are arranged to displace material of the first mounting bracket arm to form first mating splines within the first mounting bracket opening;

a second pivot bushing that is at least partially disposed within the second rake bracket first opening; and a second pivot fastener that extends at least partially through the second pivot bushing and the second mounting bracket opening to couple the second rake bracket to the second mounting bracket arm.

2. The steering column assembly of claim 1, the first axis is disposed parallel to the second axis.

3. The steering column assembly of claim 1, the second pivot fastener having second splines that are arranged to displace material of the second mounting bracket arm to form second mating splines within the second mounting bracket opening.

4. The steering column assembly of claim 1, the second axis being disposed transverse to the steering column axis.

5. The steering column assembly of claim 1, the mounting opening is disposed coaxial with the first rake bracket second opening and the second rake bracket second opening along the second axis.

* * * * *